UNITED STATES PATENT OFFICE.

MORITZ ULRICH AND KARL HEIDENREICH, OF ELBERFELD, GERMANY, ASSIGNORS TO FARBENFABRIKEN OF ELBERFELD CO., OF NEW YORK, N. Y.

ORANGE DISAZO DYE AND PROCESS OF MAKING SAME.

SPECIFICATION forming part of Letters Patent No. 678,323, dated July 9, 1901.

Application filed February 6, 1901. Serial No. 46,210. (No specimens.)

*To all whom it may concern:*

Be it known that we, MORITZ ULRICH and KARL HEIDENREICH, doctors of philosophy, chemists, (assignors to the FARBENFABRIKEN OF ELBERFELD CO., of New York,) residing at Elberfeld, Germany, have invented a new and useful Improvement in New Disazo Dyes; and we hereby declare the following to be a clear and exact description of our invention.

Our invention relates to the production of new disazo dyestuffs of considerable value by first tetrazotizing meta-diamidodiphenyl-urea or its homologues having the following general formula:

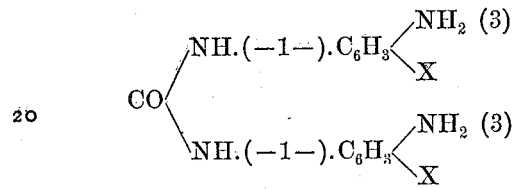

(X meaning in this formula a hydrogen atom which can be substituted by a methylic group,) and then combining the resulting tetrazo derivatives with suitable azo-dyestuff components, as either with two molecules of $beta_1$-amido-$alpha_3$-naphthol-$beta_4$-sulfonic acid or with one molecule of this acid and one molecule of an aromatic sulfonic or carboxylic acid, such as salicylic acid, $beta_1$-naphthol-$alpha_4$-sulfonic acid, or the like.

The new dyestuffs produced in the above-defined manner are alkaline salts of acids having the following general formula:

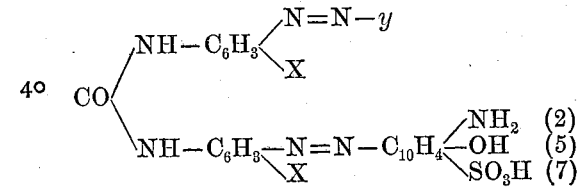

(X meaning in this formula a hydrogen atom which can be substituted by a methylic group, $y$ meaning the radical of $beta_1$-amido-$alpha_3$-naphthol-$beta_4$-sulfonic acid or the radical of an aromatic sulfonic or carboxylic acid,) and are from red to reddish-brown powders which dissolve in water with a yellowish-red color. They dye unmordanted cotton from orange to yellowish-red shades. When on fiber, these dyestuffs can be further diazotized and coupled with beta-naphthol, valuable bordeaux shades, which are fast to washing, being thus obtained.

In carrying out our new process practically we can proceed as follows, the parts being by weight: 24.2 parts of meta-diamidodiphenyl-urea, having the formula

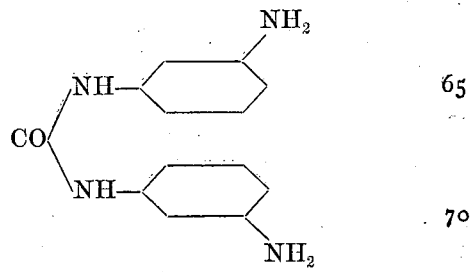

are dissolved in about one hundred parts of hot water, with the addition of forty-two parts of a 36.5 per-cent. hydrochloric acid. Subsequently a watery solution of fourteen parts of sodium nitrite is slowly added while cooling. The diazo solution thus obtained is then mixed with a watery solution prepared from fifty parts of $beta_1$-amido-$alpha_3$-naphthol-$beta_4$-sulfonic acid and forty parts of sodium carbonate, ($CO_3Na_2$.) The disazo dyestuff thus produced is separated with the aid of common salt, filtered off, and dried. It is the sodium salt of an acid having the formula

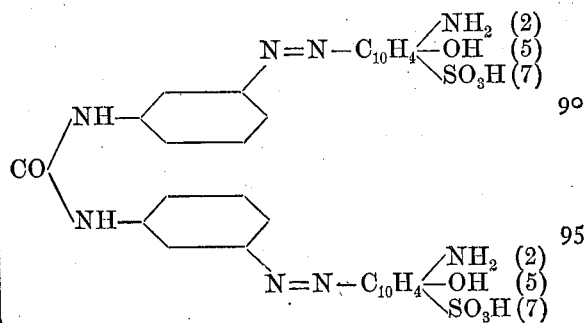

and is a reddish-brown powder, being readily soluble in water and in ammonia with a yellowish-red color, scarcely soluble in alcohol with an orange color. By concentrated sulfuric acid (of 66° Baumé) it is dissolved with a yellowish-red color. By the addition of ice to this solution a brown precipitate is obtained.

The new coloring-matter dyes unmordanted cotton orange shades. When on fiber, the coloring-matter can be further diazotized and developed by means of betanaphthol, pure bordeaux shades being thus produced, which are fast to washing.

Having now described our invention and in what manner the same is to be performed, what we claim as new, and desire to secure by Letters Patent, is—

1. The process for producing new disazo dyestuffs, which process consists in first tetrazotizing the meta-diamidodiphenyl-urea compounds having the following general formula:

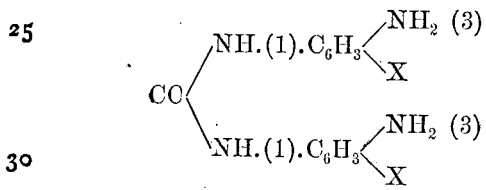

X meaning in this formula a hydrogen atom which can be substituted by a methylic group and then combining the resulting tetrazo compounds with the herein-defined azo dyestuff components, substantially as hereinbefore described.

2. The process for producing a new disazo dyestuff, which process consists in first tetrazotizing the meta-diamidodiphenyl-urea having the formula:

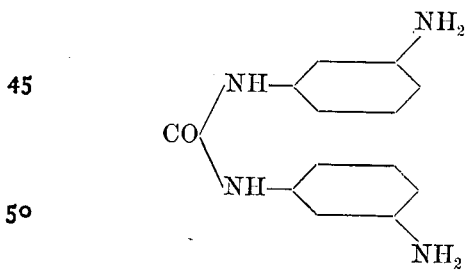

and then combining the resulting tetrazo compound with two molecules of beta₁-amido-alpha₃-naphthol-beta₄-sulfonic acid, substantially as hereinbefore described.

3. The herein-described new disazo dyestuffs which are alkaline salts of acids hereinbefore described having the general formula:

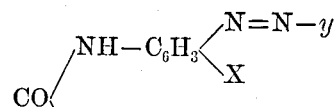
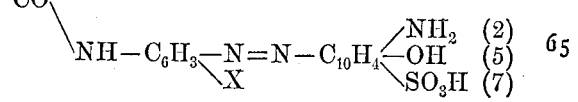

and which are from red to reddish-brown powders soluble in water with a yellowish-red color, dyeing unmordanted cotton from orange to yellowish-red shades, which, when on fiber, can be further diazotized and coupled with beta-naphthol, bordeaux shades of considerable value being thus obtained which are fast to washing, substantially as hereinbefore described.

4. The herein-described new disazo dyestuff being an alkaline salt of an acid having the following formula:

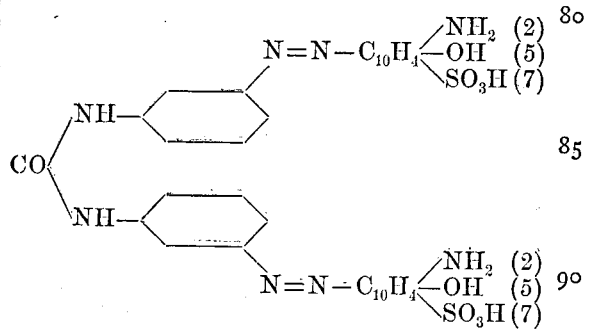

which in the form of the sodium salt is a reddish-brown powder, readily soluble in water and in ammonia with a yellowish-red color, scarcely soluble in alcohol with an orange color, being dissolved by concentrated sulfuric acid of 66° Baumé with a yellowish-red color, a brown precipitate being obtained by the addition of ice to this solution; dyeing unmordanted cotton orange shades which shades can be further diazotized and developed on the fiber by means of betanaphthol pure bordeaux shades being thus obtained which are fast to washing, substantially as hereinbefore described.

In testimony whereof we have signed our names in the presence of two subscribing witnesses.

MORITZ ULRICH.
KARL HEIDENREICH.

Witnesses:
OTTO KÖNIG,
FR. SCHADDE, Jr.